United States Patent [19]

Otte et al.

[11] 3,861,030

[45] Jan. 21, 1975

[54] ARTICLE AND METHOD FOR LOCATING CONTACTS

[75] Inventors: Richard F. Otte, Los Altos; Lajos J. Vidakovits, Mountain View, both of Calif.

[73] Assignee: Raycehm Corporation, Menlo Park, Calif.

[22] Filed: Apr. 4, 1974

[21] Appl. No.: 457,995

[52] U.S. Cl. .................... 29/626, 29/628, 269/286, 339/30

[51] Int. Cl. .......................................... H05k 3/32

[58] Field of Search.......... 29/626, 628, 629, 630 R, 29/630 B, 630 D, 447; 339/30; 269/285, 286

[56] References Cited

FOREIGN PATENTS OR APPLICATIONS

| | | | |
|---|---|---|---|
| 1,234,303 | 5/1959 | France | 339/30 |
| 538,757 | 8/1941 | Great Britain | 339/30 |

*Primary Examiner*—C. W. Lanham
*Assistant Examiner*—Joseph A. Walkowski
*Attorney, Agent, or Firm*—Lyon and Lyon

[57] ABSTRACT

A carrier is described for properly locating a plurality of contacts relative to a printed circuit board or the like in which the contacts are to be installed. The contacts themselves are of the type having a heat recoverable metallic band disposed about a resilient member such as the tines of a fork member so that the tines will be caused to be spaced closely together during a first temperature range and spaced further apart during a second temperature range. The carrier comprises an elongated member from which depend a plurality of tabs, the tab centers being separated by a distance equal to that separating the holes on the printed circuit board adapted to receive the contacts. A plurality of contacts are heat recovered onto the tabs so that the tines of each contact grasp one of the tabs. In use, the carrier is positioned over a printed circuit board and the contacts plugged into the appropriate holes thereof and soldered in place. All of the contacts are then simultaneously cooled so that the tines separate permitting the removal of the tabs of the carrier and their replacement with the pins or leads of any suitable electrical device such as those found on an integrated circuit package.

13 Claims, 15 Drawing Figures

ARTICLE AND METHOD FOR LOCATING CONTACTS

BACKGROUND OF THE INVENTION

Printed circuit boards are widely used in any number of applications to mount electronic components. Generally, the components, or the packages in which they are contained, are provided with a plurality of leads or pins which plug into holes in the printed circuit board so that a soldered connection can then be made. Such solder connections provide good electrical contact and have good mechanical properties. However, a soldered connection is in essence a permanent connection and it is often difficult to remove components from the boards without damaging the components or the board. In order to provide a removable connection, it is known to pre-attach a spring-loaded retaining socket to the circuit board and rely solely on the spring characteristics of the socket to retain the component in place. While such a system does provide ease of replacement, the characteristics of such connections are not normally as good as soldered connections. Moreover, such contacts deteriorate as a result of the environment in which they are located and cause the electrical properties to change. The mechanical retaining force of such sockets is also not always satisfactory, particularly where the board is to be exposed to shock or vibration.

An extremely reliable contact which can be pre-soldered to a printed circuit board and which exerts a very strong retaining force on an electrical component after it is installed is disclosed in U.S. Pat. No. 3,740,839, the disclosure of which is incorporated by reference herein. Briefly, the contact therein disposed comprises a resilient member such as a forked member fabricated from beryllium copper having at least two tines capable of being moved inwardly and when so moved to exert an outward force on the means which is moving them inwardly. A band of heat recoverable metallic material, for example, of a suitable alloy of titanium nickel, is placed around the exterior of the tines. When the metallic band is at a first temperature it will be in its austenitic state, during which state it will have substantial strength and will attempt to assume a small diameter condition with the result that the tines will be pressed inwardly against any object inserted between them. When the metallic band is cooled, it will go into its martensitic state, its strength will decline, and the spring forces of the tines will deform it to a larger diameter condition with the result that the object previously held by the tines will be released.

SUMMARY OF THE INVENTION

According to the present invention, an article and method are provided for conveniently and quickly mounting an electrical component on a printed circuit board through the use of contacts such as those described in the aforementioned patent. According to the present invention, a plurality of such contacts are mounted on a plurality of tabs depending from an elongated carrier strip, the centers of the tabs being spaced apart by a distance equal to that of the expected spacings of the holes on a printed circuit board. The contacts are installed on the tabs of the carrier by cooling them until the metallic bands enter the martensitic state thus opening the tines to receive the tabs and then permitting the bands to revert to the austenitic state. The carrier strip can be of any desired length so that the user can detach a segment carrying the requisite number of connecting devices from the remainder of the carrier strip. This segment is then positioned over the printed circuit board and the pins of the contacts inserted in the holes of the circuit board. All of the contacts are then soldered to the board, preferably, simultaneously. Once the contacts are in place, they are simultaneously cooled to a temperature sufficient to transform the metallic bands from the austenitic to the martensitic state with the result that the tines open releasing the tabs of the carrier strip segment. The tabs of the carrier strip are immediately replaced with the terminal pins of an electronic component and the contacts permitted to warm up so that their tines once again assume the closed position and firmly retain the electronic component in place. When it is desired to replace or otherwise remove the component, it is simply done by once again cooling the contacts so that the tines thereof will release the terminal pins.

DESCRIPTION OF THE INVENTION

Figure 1:
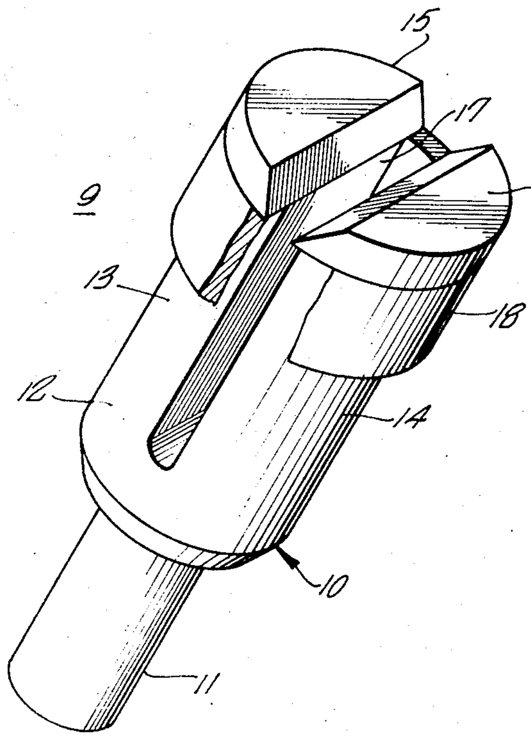
FIG. 1 is a perspective view of a first contact employed in the present invention.
Figure 2:
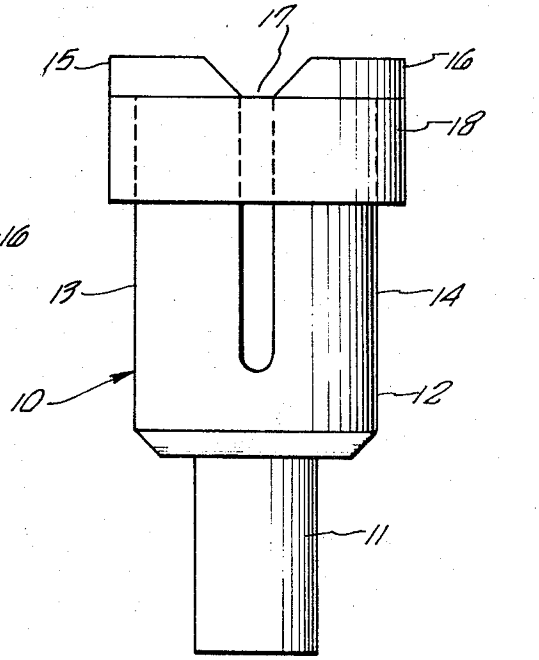
FIG. 2 is a side view of such a contact.

Turning now to FIGS. 1 and 2, a contact 9 similar to those described in the aforementioned patent is illustrated. A forked member 10 has a lower pin member 11 adapted to be plugged into a hole in a printed circuit board, an intermediate cylindrical portion 12, and a pair of tines 13 and 14, the tines being capped by shoulder members 15 and 16. The tines 13 and 14 define a slot 17 for receiving the terminal pin of an electronic component. Preferably, the portion of the shoulder members 15 and 16 adjacent to the slot 17 are chamfered to assist the entry of the pin. Positioned over the tines 13 and 14 is a band or ring 18 fabricated from a heat recoverable metal material, for example, the titanium nickel alloy disclosed in U.S. Pat. No. 3,753,700, the disclosure of which is incorporated by reference herein. The forked member is preferably fabricated of beryllium copper.

As disclosed in U.S. Pat. No. 3,740,839, the device illustrated in FIGS. 1 and 2 will have two dimensional conditions; the first when the metal band 18 is in its austenitic state, and the second when it is in its martensitic state. When the band 18 is cooled to a temperature sufficiently low to transform the alloy thereof to its martensitic state, the natural stiffness of the tines 13 and 14 of the forked member 10 will be sufficient to deform the band to a larger diameter condition. In this condition, an object can easily be inserted into the slot 17. When the band 18 is permitted to rise in temperature, it will be transformed into its austenitic state with the result that it will assume a reduced diameter condition and force the tines 13 and 14 inwardly, reducing the width of the slot 17. Any object inserted therein will be grasped firmly by the tines 13 and 14 assuming, of course, that the object has a dimension greater than the final spacing between the tines 13 and 14.

Figures 3, 4:
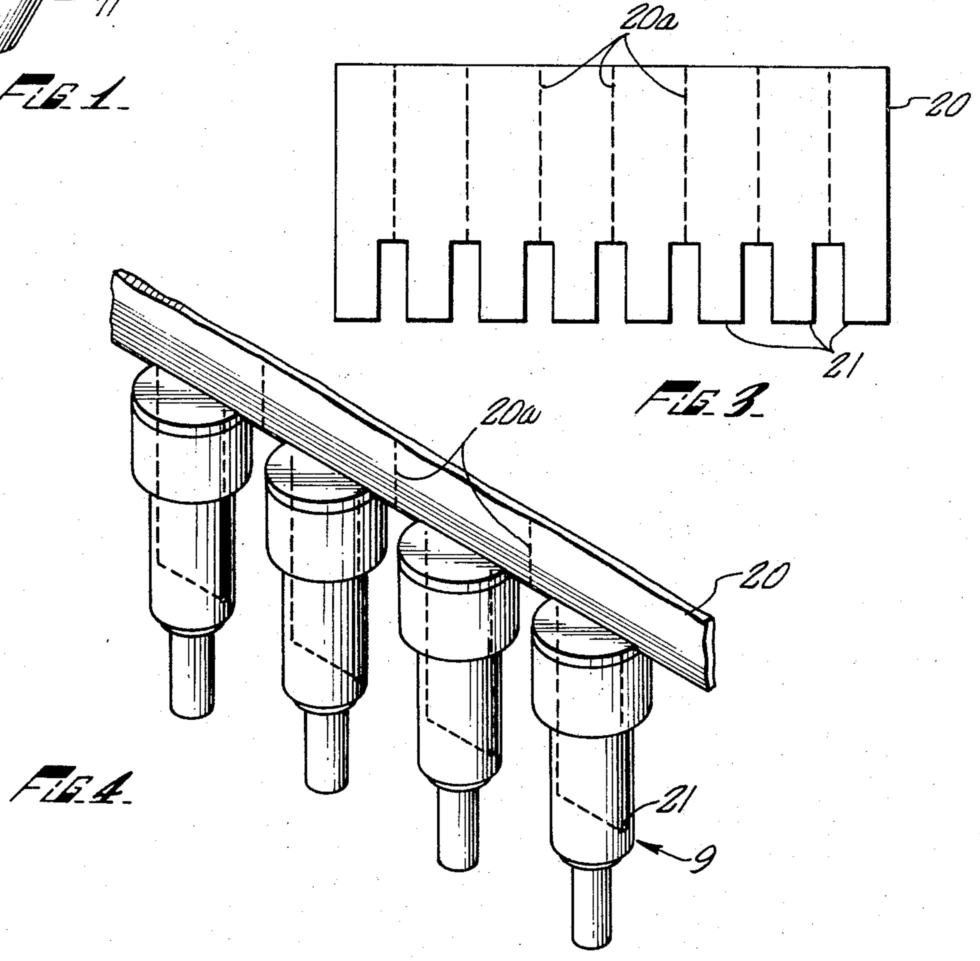
FIG. 3 is a side view of one form of a carrier strip according to the present invention.
FIG. 4 is a fragmentary perspective view of a carrier strip of the present invention on which are mounted a plurality of contacts.
Figures 5, 6:
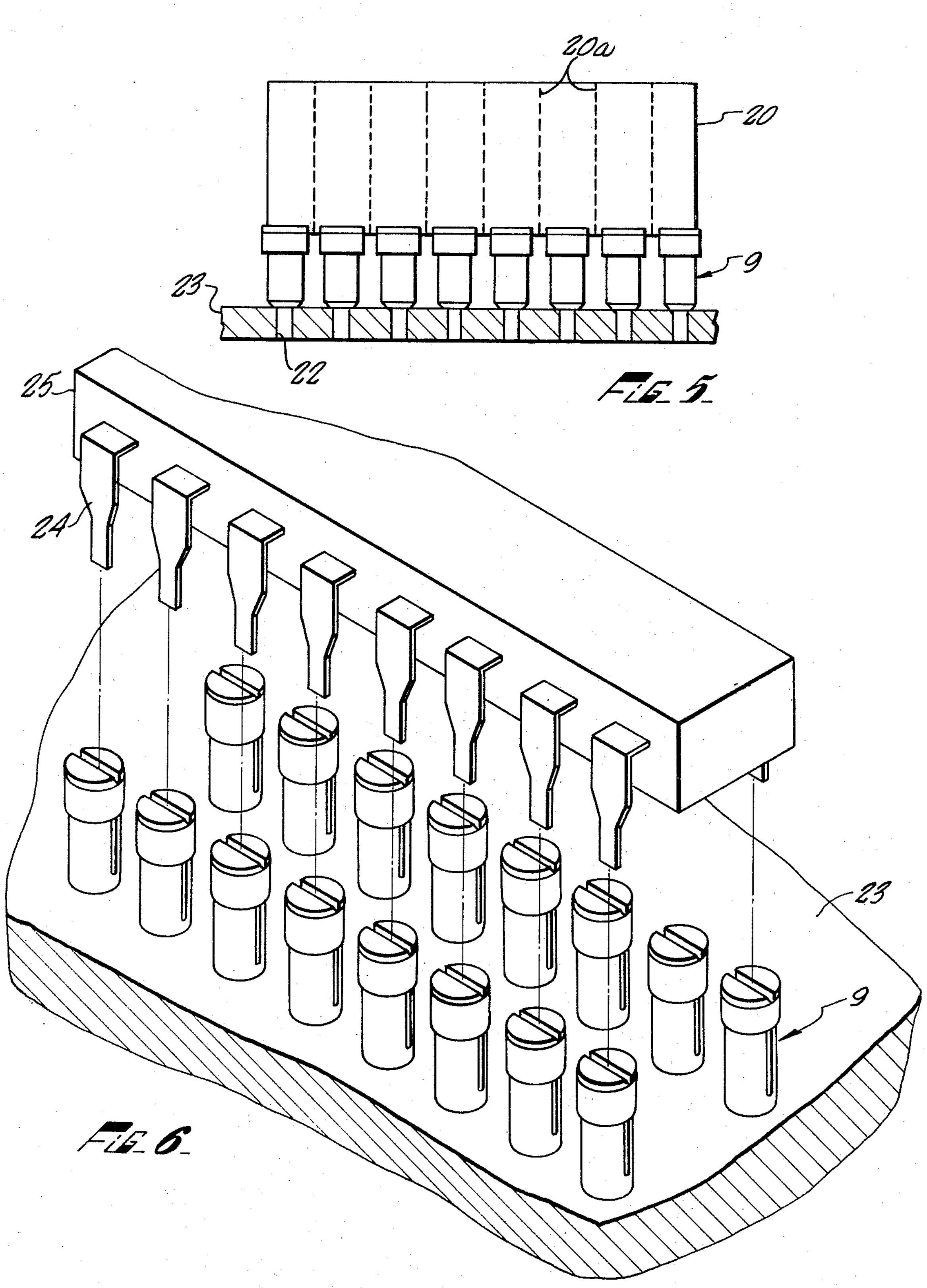
FIG. 5 is a side elevation, partly in section, showing the carrier strip positioning the contacts in place in a printed circuit board.
FIG. 6 is a perspective view showing the installed contacts about to receive the pins of an electronic component.

FIGS. 3 to 5 illustrate a typical carrier member 20 to be used in combination with the contact shown in FIGS. 1 and 2. The carrier member 20 may be a single strip provided with a plurality of depending tabs 21 whose center are spaced apart a distance corresponding to the spacing of the holes in a printed circuit board, or, alternatively, may be U-shaped with each leg provided with depending tabs. This spacing, of course, corresponds to the spacing of the terminal pins of the electronic component which is ultimately to be installed on the printed circuit board. Preferably, the thickness of each of the tabs 21 is slightly smaller than that of the terminal pin or lead ultimately to be installed in the contact, and the width of the tabs 21 slightly less than the inside diameter of the ring 18. The length of the tabs 21 is preferably great enough to cause the tab to engage the bottom of the slot 17 of the contact. By providing the tabs 21 with these dimensions, it can be insured that the contacts to be mounted on the carrier 21 are accurately located on the desired centers and at a consistent height. Sizing the thickness of the tab 21 slightly smaller than the terminal pin of the component ultimately to be installed establishes a test for the contact for if it firmly grasps the tab it can be assured that it will equally firmly grasp the terminal pin. The carrier member 20 is preferably provided with perforations or partially cut through so as to form break lines 20*a* so that the user can select the number of contacts to be used.

FIG. 4 shows the carrier 20 having a plurality of contacts 9 mounted on the tabs 21. The contacts 9 are now ready to have their pin portions 11 inserted in the holes 22 of a printed circuit board 23 as shown in FIG. 5. The pins 11 of the contacts 9 can now be soldered to the board 23 by any conventional soldering method. The contacts 9 can then be cooled simultaneously to a temperature below that of the martensitic transition temperature so that the tines 13 and 14 move outwardly releasing the tabs 21 of the carrier. While the contacts 9 are still in this condition, the leads 24 of any suitable electronic component 25 can be inserted into the slots 17 as shown in FIG. 6. As the temperature then rises, the metallic bands of the contacts 9 will revert to their austenitic state with the result that the tines 13 and 14 will press firmly against the leads 24 of the component 25 and establish a good electrical and mechanical connection therewith. If it is desired to remove the component 25, it is only necessary to once again reduce the temperature of the bands 18 of the contacts 9 so that the tines thereof separate and release the leads of the component 25.

Figure 7:
FIG. 7 is a side view of a second form of carrier strip according to the present invention.
Figure 8:
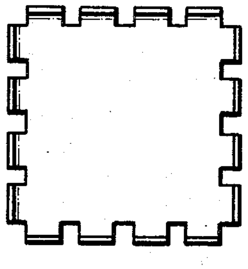
FIG. 8 is a bottom view of the carrier strip of FIG. 7.
Figure 9:
FIG. 9 is a side view of a third form of carrier strip according to the present invention.
Figure 10:
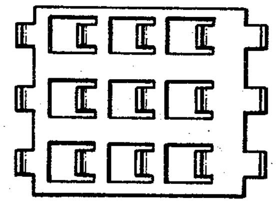
FIG. 10 is a bottom view of the carrier strip of FIG. 9.
Figure 11:
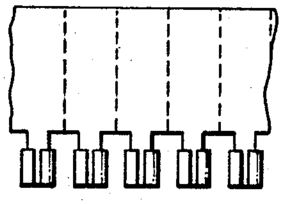
FIG. 11 is a side view of a fourth form of carrier strip according to the present invention.
Figure 12:
FIG. 12 is an end view of the carrier strip of FIG. 11.
Figure 13:
FIG. 13 is a top view of the carrier strip of FIG. 11.

While the carrier 20 has been illustrated as having eight depending tabs per leg, it should be understood that the carrier can be of a much greater length such that the user can cut or break it in lengths or segments corresponding to the number of connector devices to be used. Moreover, in some cases it may be desirable to provide the carrier with a more complex configuration, for example, it might be square as shown in FIGS. 7 and 8 or it might be provided with a pattern of tabs such as the three by five array shown in FIGS. 9 and 10. Preferably, the carrier is stamped or otherwise fabricated from a sheet of any suitable metal although other materials can also be used. In the event that the contacts 9 are designed to have round rather than rectangular slots for receiving terminal pins, a suitable carrier can be provided by simply rolling the tabs 21 into a split tube of appropriate diameter as shown in FIGS. 11, 12 and 13.

Figures 14, 15:
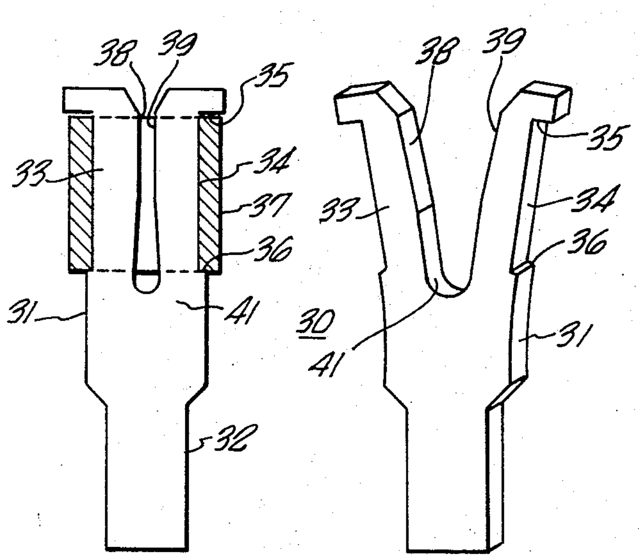
FIG. 14 is a side elevation of a second contact employed in the present invention.
FIG. 15 is a perspective view of the forked member employed in the contact of FIG. 14.

FIGS. 14 and 15 illustrate a stampd version of a contact suitable for use with the carrier members of the present invention. As can be seen, this contact, generally indicated at 30, is provided with a generally Y-shape of forked member 31, having a pin member 32 and a pair of tines 33 and 34. Each of the tines is provided with a recess formed by an upper shoulder 35 and a lower shoulder 36. These shoulders act to lock the metal band 37 in place and prevent it from being pushed either up or down. If desired, the contact 9 shown in FIGS. 1 and 2 could also, of course, be provided with a similar lower shoulder. In the contact of FIGS. 14 and 15, the metallic band 37 can be placed around the tines 33 and 34 by deforming it to a more elliptical configuration to give clearance during installation. In many cases, it will be desirable to stamp the forked member 31 with contacting surfaces 38 and 39 near the tip of the tines 33 and 34 that are parallel with the outer surfaces of the tines that are engaged by the band 37, so that when the band 37 contracts, the surfaces 38 and 39 will be parallel and able to make good contact with a terminal pin. It may also be desirable to stamp the slot between tines 33 and 34 so that the width of this slot is greater at the base 41 just below the band 37 than it is between the contacting surfaces 38 and 39. This permits sheet stock that is quite thick compared to the terminal pin thickness to be used for the stamping.

From the foregoing it should be apparent that the specific forms of the present invention described are intended to be illustrative only and not limiting as many other applications of the inventive concept disclosed herein can be employed.

We claim:

1. An article for use in connecting an electronic component to a printed circuit board or the like comprising:

a carrier member having a plurality of extending tabs, said tabs being spaced apart a distance substantially equal to the spacing of the leads of an electronic component;

a plurality of contact devices, each of said contact devices having means defining an opening, said opening defining means being temperature responsive so that said opening can selectively and reversibly assume a smaller dimension condition at a first temperature and a larger dimension condition at a second temperature, said smaller dimension being smaller than a corresponding dimension of said tabs and said larger dimension being larger than said corresponding dimension;

each of said contact devices being positioned on said carrier member with its opening defining means receiving one of said tabs, said opening defining means being in its smaller dimension condition whereby said opening defining means firmly grasps said tab.

2. The article of claim 1 wherein said opening defining means comprises a pair of tines capable of assuming a first spacing at said first temperature and a band of heat recoverable metal positioned about said tines and capable of causing said tines to assume a second, smaller spacing at said second temperature.

3. The article of claim 1 wherein said opening defining means define a slot and wherein said tabs have a length greater than the depth of said slot.

4. The article of claim 3 wherein said tabs have a width slightly less than the width of said slot.

5. The article of claim 1 wherein said corresponding dimension of said tabs is slightly less than the corresponding dimension of the leads of said electronic component.

6. The article of claim 1 wherein said carrier member is fabricated of a material that can be easily cut into segments.

7. The article of claim 1 wherein said tabs are formed in a plurality of parallel rows.

8. The article of claim 1 wherein said tabs are formed in the shape of a rectangle.

9. The article of claim 1 wherein said tabs are formed in an array.

10. The article of claim 1 wherein said tabs are generally cylindrical in configuration.

11. A method of installing an electronic component on a printed circuit board or the like comprising:

positioning a carrier strip having a plurality of tabs bearing a plurality of reversibly temperature actuable contact devices over a series of holes in said printed circuit board;

moving said carrier strip relative to said board to cause a portion of each of said contact devices to enter into a corresponding hole in said board;

permanently affixing said contact devices to said board;

cooling said contact devices to actuate them and permit said tabs of said carrier means to be removed therefrom;

inserting the leads of said electronic components into said contact devices in place of said tabs; and permitting the temperature of said contact devices to rise to reverse their actuation and grasp said leads.

12. The method of claim 11 wherein said contact devices are permanently affixed to said board by soldering.

13. The method of claim 11 wherein tabs are released and said leads inserted without any intervening reverse actuation of said contact devices.

* * * * *